കുറിപ്പ്

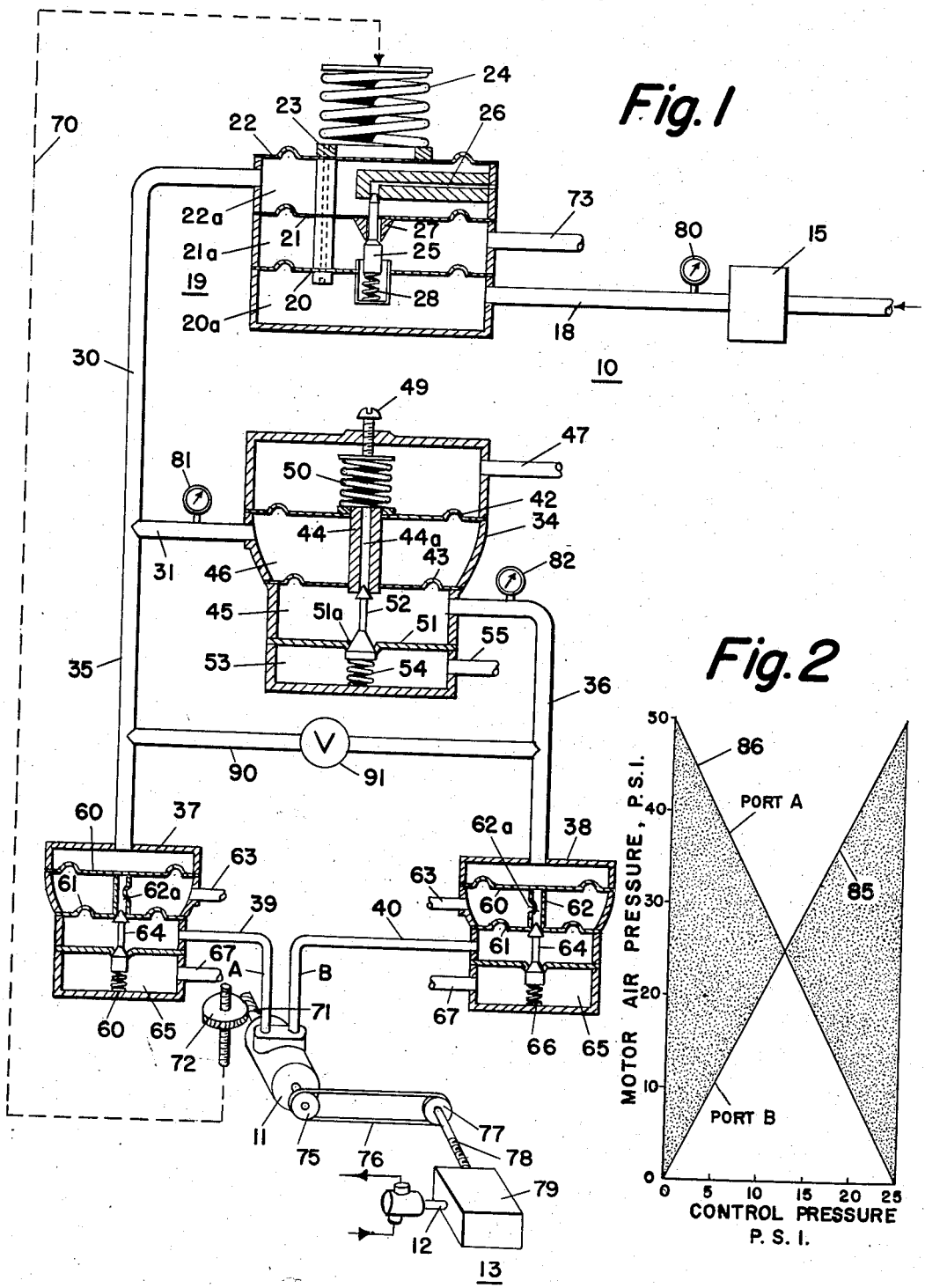

United States Patent Office 2,880,705
Patented Apr. 7, 1959

2,880,705

CONTROL SYSTEM FOR REGULATING THE POSITION OF A CONTROL ELEMENT

George William Schneider, Oreland, Pa., assignor to Milton Roy Company, Philadelphia, Pa., a corporation of Pennsylvania Application November 3, 1955, Serial No. 544,635

6 Claims. (Cl. 121—41)

This invention relates to a system for controlling the magnitude of a condition such as flow, pH, temperature or the like, and has for an object the provision of a control system including a rotating type reversible fluid-operated motor and a differential pressure relay network for regulating the position of a control element.

In one form of the invention there is provided a control system comprising an element, the position of which is to be controlled such, for example, as the stroke of a pump plunger for supplying a condition-varying medium. The element is preferably mechanically interconnected with a rotating type reversible fluid-operated motor to position the element in accordance with the position of the motor. A means responsive to the magnitude of the condition for supplying a controlled pressure to the motor is connected to the latter by way of a differential pressure relay network for controlling the speed and direction of the rotation of the motor, and feedback means is connected between the motor and the controlled pressure supplying means to adjust the latter in accordance with change in position of the motor. The differential pressure relay network preferably includes a plurality of pressure booster relays each connected to separate ports of the reversible motor and a reversing pressure relay interconnecting the plurality of pressure relays.

Further in accordance with the invention the pressure differential network includes a pair of pressure booster relays connected to a corresponding pair of ports of the reversible motor and a supply of high pressure connected to the pair of pressure booster relays. A reversing pressure relay is interconnected to one relay of said pair of pressure booster relays, the network being operable to control the supply of high pressure to drive the motor selectively in opposite directions in rapid response to a signal pressure. A source of low pressure is connected to the network with means for controlling the application of the low pressure to the network, the last-named means being automatically adjustable in response to variations in the value of the condition. There is also provided means operated by the motor as it rapidly moves to neutralize the adjustment of the control means. To eliminate hunting of the reversible motor, there preferably is provided an adjustable by-pass valve in the pressure differential relay network connected between the control pressure lines of the pair of pressure relays to introduce a control over the rate of response of the pair of pressure relays.

For a more detailed disclosure of the invention and for further objects and advantages thereof, reference is to be had to the following description taken in conjunction with the accompanying drawings in which:

Fig. 1 is a diagrammatic view of one form of the invention; and

Fig. 2 is a diagram useful in explaining the invention.

Referring to Fig. 1, there is diagrammatically illustrated a control system 10 in accordance with the present invention for controlling the speed and direction of rotation of a rotating type reversible fluid-operated motor 11 which in turn controls the position of a control element 12 to regulate the supply of a condition-varying medium. For purposes of explanation the reversing motor 11 has been illustrated as of the pneumatic type and the control element 12 has been illustrated as the plunger of a controlled volume pump 13 for regulating the supply of the condition-varying medium. The stroke control mechanism 79 has been illustrated diagrammatically and may be of any suitable type such, for example, as that shown in Sheen Patent No. 2,587,395 or Saalfrank Patent No. 2,640,425. It is to be understood that this showing is by way of example only and not of limitation and that the system of the present invention is applicable for use in other applications such as valve operators, control of variable speed transmissions, damper operators, control of variable pitch propellers in fans or blowers, and positioning of control rods in nuclear reactors or the like.

The magnitude of the condition under control is applied to a suitable measuring instrument 15 illustrated here as of the pneumatic type and well known in the art. The instrument 15 in turn supplies a pneumatic loading signal proportional to the magnitude of the condition by way of line 18 to a pneumatic positioner 19. The pneumatic positioner 19 may be of any suitable type and has been diagrammatically illustrated here as of the type including three diaphragms 20, 21 and 22 separating the pneumatic positioner 19 into three separate chambers 20a, 21a and 22a. All of the three diaphragms 20–22 are rigidly interconnected by means of a member 23. Thus movement of one of the diaphragms will in turn cause concurrent movement of the other two diaphragms. The supporting element 23 is held under bias by means of a coil spring 24. Within the pneumatic positioner 19 there is disposed a valve member 25 associated with an exhaust port 26 in the diaphragm chamber 22a and also with a port 27 in the diaphragm 21 interconnecting the top and middle diaphragm chambers 22a and 21a of the pneumatic positioner. The valve 25 is biased in an upward direction as by a coil spring 28 supported from diaphragm 20 and bearing against the lower end of valve member 25.

The pneumatic positioner 19 is connected by way of line 30 to a pressure differential relay network in accordance with the present invention. The network includes a reversing relay 34 connected by way of line 31 and pressure lines 35 and 36 to volume booster relays 37 and 38 respectively, the latter each being connected to separate ports A and B of reversing motor 11 by way of lines 39 and 40.

The reversing relay 34 may be of any suitable type and has been illustrated as including a pair of flexible diaphragms 42 and 43, the latter being of smaller area than the former. Both of diaphragms 42 and 43 are interconnected by means of a rigid member 44 which has a passageway 44a extending therethrough to permit escape of pressure from a chamber 45 beneath diaphragm 43, and associated with line 36, to the exhaust line 47 at the upper end of reversing relay 34. The reversing relay 34 may be adjusted by means of a balancing adjustment which includes a screw member 49 to change the bias of a spring 50 applied to the member 44 which interconnects the two diaphragms 42 and 43. Within the reversing relay 34 there is provided a valve member 52 adapted to open and close the passage in member 44 and also to control the passage of air from a supply chamber 53 to the chamber 45. The valve member 52 is normally biased to closed position as by a spring 54 disposed between the bottom of supply chamber 53 and the bottom of valve member 52. A limited air supply is introduced into supply chamber 53 by way of line 55.

The air volume booster relays 37 and 38 are of similar construction and each comprises a pair of flexible diaphragms 60 and 61 forming a chamber and interconnected by means of a rigid element 62 having a passageway 62a extending therethrough for interconnection with an exhaust port 63 for the chamber. The passageway 62a is opened and closed by means of a valve member 64 which is disposed within the air volume booster relays, the lower end of the valve member 64 being adapted to open and close a port in air supply chamber 65. The valve member 64 is normally biased upwardly into closed position with respect to passageway 62a and supply air is introduced to chamber 65 by way of supply line 67.

In operation of control system 10 it will first be assumed that there is an increase in the instrument air signal from instrument 15, thus increasing the pressure within the lower diaphragm chamber 20a in pneumatic positioner 19 causing the diaphragm 20 to be raised. As diaphragms 21 and 22 are both connected to the lower diaphragm 20 by means of rigid member 23, all three diaphragms 20—22 will be concurrently raised, thus causing valve member 25 to close the exhaust port 26 and to open the passageway 27 around valve member 25 and through diaphragm 21. When passageway 27 is opened, the regulated air supply from line 73 will enter the diaphragm chamber 22a between diaphragms 21 and 22, thus increasing the pressure in that chamber and also in line 30 leading to the differential pressure relay network. This increase in pressure will be transmitted through line 35 to air volume booster relay 37 which will force its diaphragms 60 and 61 downwardly closing its exhaust port 62a and opening its valve element 64 with respect to its air supply chamber 65. Thus an increase in air supply will be provided by way of a line 67 of air volume booster relay 37 to line 39 and its corresponding port A of reversing air motor 11. At the same time there will be a reduction in air pressure in the line 40 connected to the other port B of motor 11.

The reduction of pressure in line 40 results from the combined effects of the reversing relay 34 and the air volume booster relay 38 in the following manner. It will be recalled that the pressure in line 30 was changing in an increased direction. Thus the pressure within the chamber 46 of reversing relay 34 formed between diaphragms 42 and 43 is also changing in an increased direction. As diaphragm 42 has a larger area than diaphragm 43, the aforesaid increase in pressure will cause diaphragm 42 to compress spring 50 moving element 44 upwardly, permitting valve element 52 to move upwardly under the bias of spring 54 until the lower seat of valve element 52 closes the passageway 51a in the rigid partition 51. After passageway 51a is closed, further upward travel of element 44 opens the passageway 44a with respect to valve element 52, thereby permitting the escape of pressure from chamber 45 through passageway 44a to exhaust passage 47. This results in a decrease in pressure within chamber 45 and a corresponding decrease in pressure in air control line 36 interconnecting chamber 45 with air volume booster relay 38. By reason of the decrease in pressure in air volume booster 38, its upper diaphragm 60 will move in an upward direction causing member 62 also to move in an upward direction, thereby opening the passage 62a with respect to valve element 64 and permitting exhaust of pressure from line 40 through passage 62a to the exhaust connection 63. Thus it will be seen that with an increase in instrument signal pressure to line 18 there will be an increase in pressure in line 39 to port A of motor 11 and a corresponding decrease in pressure in line 40 to the opposite port B of motor 11.

Motor 11 has been illustrated as of the reversible fluid-operated type. In one application motor 11 took the form of a reversible air motor of the vane type provided with a rotor having a shaft extension at either end of the motor housing. One shaft extension was mechanically connected by a linkage 70 to pneumatic positioner 19 to provide a feedback connection in the system.

If the internal mechanism of pneumatic positioner 19 is not in a position corresponding to the instrument loading signal from instrument 15, the positioner 19 introduces an air signal by way of line 30 to the relay system which positions the motor 11 until the mechanical feedback linkage 70 repositions the positioning mechanism of pneumatic positioner 19 so that it is in equilibrium with the pneumatic instrument loading signal. In one application a shaft extension of motor 11 was provided with a worm 71 for cooperation with a worm gear 72 forming a gear reduction unit in the mechanical feedback linkage 70 which is adapted to adjust the pressure on spring 24 of the pneumatic positioner 19. The opposite shaft extension of motor 11 may be directly connected to the control element or may be provided with a gear 75 cooperating with a chain 76 for driving a gear or sprocket 77 to rotate the adjustment screw 78 of a stroke control device 79 to adjust the stroke of plunger 12 in a controlled volume pump 13 which in turn regulates the condition-varying medium in accordance with change in the magnitude of the condition from a predetermined control point.

The operation of the complete system will now be described in connection with a decrease in signal pressure and with reference to exemplary ranges of pressure within which the system has provided satisfactory operation, it being understood that other suitable ranges of pressure may be utilized as desired. Control instrument 15 may be of the flow controlling type providing an instrument air signal within a range, for example, of from 3 to 15 p.s.i. This pressure may be read from a suitable gauge 80 in line 18. Line 73 connected to pneumatic positioner 19 is preferably provided with a regulated air supply, for example in the order of 25 p.s.i. Thus the pressure in the upper diaphragm chamber 22a of pneumatic positioner 19 and in lines 30, 31 and 35 leading to the reversing relay 34 and the air volume booster relay 37 will vary from 0 to 25 p.s.i. A gauge 81 may be located in line 31 to indicate the motor control pressure existing in lines 30, 31 and 35. The reversing relay 34 is also provided with a regulated air supply, for example 25 p.s.i., which is introduced by way of line 55 into the bottom chamber 53 of reversing relay 34. Thus the pressure in chamber 45 of reversing relay 34 or in control line 36 leading to air volume booster relay 38 will be in a range from 25 to 0 p.s.i. This pressure may be indicated by means of a gauge 82 inserted in line 36. Each of the air volume booster relays 37 and 38 is provided with a suitable source of supply air at a higher pressure such, for example, as a supply at a pressure of 60 p.s.i. introduced to relays 37 and 38 respectively by lines 67, 67.

The air volume booster relays 37 and 38 may be provided with any selected ratio such, for example, as 2 to 1. As the input pressure range to relay 37 is 0 to 25 p.s.i., its output pressure in line 39 to port A of reversing air motor 11 will be 0 to 50 p.s.i. Similarly, as the input pressure in line 36 to relay 38 is 25 to 0 p.s.i., its output pressure in line 40 to port B of the reversing air motor 11 will be 50 to 0 p.s.i.

From the foregoing description it will be apparent that relay 38 connected to port B of reversing motor 11 by way of line 40 controls the pressure in that port inversely proportional to the output of pneumatic positioner 19. This action is obtained in accordance with the present invention by reason of the novel relay network including the reversing relay 34 which reverses the output signal from the pneumatic positioner 19. Because of this reversing relay 34 it is possible to control both the magnitude and the direction of the pressure differential between the two ports A and B of motor 11.

Before describing the operation of the control system resulting from a reduction in instrument air signal pressure, reference will now be made to the explanatory diagram in Fig. 2 which is a curve showing the positioner output pressure plotted against the differential pressure across the motor 11. In keeping with the foregoing example, the range of positioner output pressure is from 0 to 25 p.s.i., and the range of motor air pressure is from 0 to 50 p.s.i. The curve 85 illustrates the pressure applied to port B of the motor while the curve 86 represents the pressure applied to port A of motor 11. The shaded area between curves 85 and 86 indicates the pressure differential across motor ports A and B. From this graph it can be observed that when the positioner output pressure is 0 p.s.i., a maximum pressure differential of 50 p.s.i. will exist across the motor 11 driving it a maximum speed in a forward direction. As the positioner output or control pressure is increased, the differential is proportionally decreased, slowing the motor down until at 12½ p.s.i. both ports A and B of motor 11 are at equilibrium or 25 p.s.i. and the motor 11 is in a stalled or neutral position. When the positioner control pressure is increased above 12½ p.s.i., the differential pressure across the motor 11 gradually increases but in the opposite direction so that the motor operates in the reverse direction until at 25 p.s.i. a maximum differential of 50 p.s.i. exists across the motor and it is operating at maximum speed in a reverse direction. From the foregoing it will be seen that when the complete system is in balance, the positioner 19 will be delivering a steady output pressure of about 12½ p.s.i.

Assuming now that the instrument air signal from instrument 15 has changed in a decreased direction lowering the pressure in line 18 to pneumatic positioner 19 as indicated by gauge 80, the three diaphragms 20, 21 and 22 will move in a downward direction as a unit under the biasing action of spring 24 acting upon member 23 which interconnects diaphragms 20–22. By reason of such downward movement, valve element 25 will be moved away from the exhaust port 26, thus permitting the pressure in the top diaphragm chamber 22a of pneumatic positioner 19 to decrease resulting in a similar decrease in pressure in lines 30, 31 and 35 as indicated on gauge 81. This decrease in pressure causes a decrease in the control air pressure applied to air volume booster relay 37, causing diaphragms 60 and 61 thereof to move in an upward direction opening the port 62a to exhaust and reducing the pressure in line 39 applied to the port A of reversing air motor 11. At the same time the reversing relay 34, by reason of the decrease in pressure in line 31 connected to diaphragm chamber 46 between diaphragms 42 and 43 of reversing relay 34, causes the member 44 to move in a downward direction under the bias of spring 50, closing the passage 44a with respect to valve element 52 and moving the latter downwardly against biasing spring 54, thus opening port 51a causing an increase in pressure in chamber 45 and likewise in line 36 connected to air volume booster relay 38. This increase in pressure will be indicated by gauge 82 in line 36. This increase in pressure causes the diaphragms 60 and 61 of air volume booster relay 38 to move in a downward direction, closing the exhaust passage 62a with respect to valve element 64 and opening valve element 64 with respect to chamber 65 by compressing spring 66. Thus the air supply from line 67 will pass through air volume booster relay 38, increasing the pressure in line 40 applied to port B of reversing air motor 11.

As previously explained in connection with Fig. 2, when the positioner output pressure in line 30 is maintained steady at about 12½ p.s.i., the system 10 will be in balance and there will be no differential in pressure between the motor ports A and B of motor 11. However, when the output pressure from pneumatic positioner 19 is above or below about 12½ p.s.i., there will be a resultant differential in pressure across motor ports A and B. When the control pressure from the pneumatic positioner 19 is below 12½ p.s.i., the motor 11 will be rotating in one direction, and when this output pressure increases above about 12½ p.s.i., the motor 11 will have a reverse rotation. The rotation of motor 11 is fed back into the system 10 by means of mechanical feedback linkage 70 which adjusts the pressure applied to spring 24 of pneumatic positioner 19 until the mechanical feedback linkage 70 mechanically repositions the positioning mechanism of pneumatic positioner 19 so that it is in equilibrium with the pneumatic instrument loading signal from instrument 15. Due to the feedback arrangement, rotaton of the output shaft of motor 11 is always proportional to the instrument air signal of instrument 15. Concurrently with adjustment of feedback linkage 70, there will be adjustment of the mechanical drive connection between motor 11 and the stroke adjustment mechanism of pump 13 to adjust the stroke of pump plunger 12. Since there is a positive mechanical linkage between the motor 11 and the stroke adjustment of pump plunger 12, the precise positioning of the motor revolutions will result in an accurate control of the pump plunger travel which will also be proportional to the instrument air signal.

In order to prevent the system 10 from being sensitive to hunting or cycling, there has been provided a by-pass line 90 interconnecting the air control pressure lines 35 and 36 of the respective air volume booster relays 37 and 38. The line 90 is provided with a by-pass valve 91 which is adjustable for introducing a control over the rate or speed of response of the air volume booster relays 37 and 38. By adjustment of this "rate action" it is possible to completely eliminate the tendency of motor 11 to hunt or oscillate.

By providing a novel control system as described above with a pressure relay network, both the direction of rotation and speed of operation of a fluid-operated motor can be controlled by controlling the pressure differential and direction of this differential between the supply and exhaust ports of the motor. This provides for better speed control as well as braking effect on the motor which is not possible with control systems of the prior art.

While a preferred embodiment of this invention has been illustrated, it is to be understood that further modifications thereof may be made within the scope of the appended claims.

What is claimed is:

1. A control system comprising an element the position of which is to be controlled, a rotating type reversible fluid-operated motor, mechanical means interconnecting said element and said motor to position said element in accordance with the position of said motor, means responsive to a condition for supplying a control pressure to said system, a differential pressure network connected between said control pressure supplying means and said motor to control the speed and direction of rotation of said motor, said network including a plurality of pressure booster relays each connected to separate ports of said reversible motor and a reversing pressure relay interconnecting one of said pressure booster relays and said control pressure supplying means, said pressure booster relays being provided with a source of air pressure higher than said control pressure to operate said motor at pressures above said control pressure for rapid response of said motor, and feedback means connected between said motor and said control pressure supplying means automatically to adjust the latter in accordance with the change in position of said motor.

2. In a control system for controlling the position of a control element having a reversible motor to drive said element, the combination of a pressure differential network including a pair of pressure booster relays connected to a corresponding pair of ports of said reversible motor, a supply of high pressure connected to said pair of pressure booster relays, a reversing pressure relay connected to one relay of said pair of pressure booster relays, said network being operable to control said supply of high pressure to drive said motor selectively in opposite directions in rapid response to a signal pressure, a source of low pressure connected to said network, means to control the application of said low pressure to said network, said means being automatically adjustable in response to variations in the value of a condition, and means operated by said motor as it rapidly moves to neutralize the adjustment of said control means.

3. Apparatus according to claim 2 wherein said pair of pressure booster relays have control pressure lines and said network includes an adjustable by-pass valve connected between said control pressure lines of said pair of pressure booster relays to introduce a control over the rate of response of said pair of pressure relays to eliminate hunting of said reversible motor.

4. A pneumatic control system for accurately positioning a control element comprising a rotating type reversible pneumatic motor for positioning the control element in accordance with rotation of said motor, means responsive to a condition for supplying a control pressure to said motor, a pair of pressure lines interconnecting said control pressure supplying means and a corresponding pair of ports of said motor, pressure reversing means connected in one line of said pair of lines, said pressure reversing means being constructed for operation upon change in control pressure to produce a change of pressure in reverse sense in said one line whereby equal pressures will be supplied to each of said motor ports when said control system is in balance to prevent said motor from rotating, adjustable valve means flow connected between said pair of lines to prevent said reversible motor from hunting, and feedback means connected between said motor and said control pressure supplying means automatically to adjust the latter in accordance with change in position of said motor.

5. A control system for adjusting the plunger stroke of a controlled volume pump comprising a rotating type reversible fluid-operated motor, a pump stroke control shaft actuated in accordance with rotation of said motor to adjust the plunger stroke in predetermined manner relative to the magnitude of a condition, means responsive to the magnitude of the condition for supplying a control pressure to said system, a pair of pressure lines interconnecting said control pressure supplying means and a corresponding pair of ports of said motor, pressure booster means in each of said pressure lines to provide to said ports pressures proportionally higher than said control pressure to increase the sensitivity of said system, pressure reversing means connected in one line of said pair of lines whereby the pressure applied to one of said ports will vary from zero to a maximum, the pressure applied to the other of said ports will vary from maximum to zero and the total pressure applied to said pair of ports at any time will be equal to the maximum pressure, and feedback means connected between said motor and said control pressure supplying means to adjust the latter in accordance with change in position of said motor.

6. The method of adjusting the plunger stroke of a controlled volume pump by means of a rotating type reversible fluid-operated motor comprising the steps of applying an input pressure varying in accordance with the magnitude of a condition to a pressure responsive means, applying the output of the pressure responsive means differentially to the ports of the reversible motor whereby the pressure applied to one of the ports varies from zero to maximum and the pressure applied to the other motor port varies from maximum to zero with equal pressures being applied to the motor ports when the control system is in balance to prevent the motor from rotating, boosting the output from the pressure responsive means before application to the ports of the reversible motor to increase the speed of response of the motor, and feeding back a pressure to the pressure responsive means resulting from rotation of the motor to adjust the pressure responsive means in accordance with the change in position of the motor.

References Cited in the file of this patent

UNITED STATES PATENTS

| | | |
|---|---|---|
| 2,243,781 | Thornhill | May 27, 1941 |
| 2,503,397 | Valley | Apr. 11, 1950 |
| 2,601,511 | Gaffney | June 24, 1952 |